United States Patent [19]
Ganzel

[11] Patent Number: 6,053,582
[45] Date of Patent: Apr. 25, 2000

[54] INTEGRATED ABS/TC/VSC BRAKING SYSTEM WITH SEPARATE BOOST VALVE

[75] Inventor: Blaise J. Ganzel, Ann Arbor, Mich.

[73] Assignee: Kelsey-Hayes Company, Livonia, Mich.

[21] Appl. No.: 08/907,838

[22] Filed: Aug. 14, 1997

Related U.S. Application Data

[60] Provisional application No. 60/023,939, Aug. 14, 1996.

[51] Int. Cl.$^7$ ........................................... B60T 8/34
[52] U.S. Cl. .................... 303/113.3; 303/114.1; 188/358
[58] Field of Search ........................ 303/DIG. 2, DIG. 3, 303/113.2, 113.3, 114.1, 114.2, 116.1, 116.2, 119.1, 50, 114.3; 188/358, 365, 359

[56] References Cited

U.S. PATENT DOCUMENTS

| | | | |
|---|---|---|---|
| 3,768,874 | 10/1973 | Riordan | 303/114.1 |
| 3,866,983 | 2/1975 | Kondo | 303/116.1 |
| 3,898,809 | 8/1975 | Baker . | |
| 4,007,593 | 2/1977 | Baker . | |
| 4,641,894 | 2/1987 | Belart | 303/114.1 |
| 4,750,329 | 6/1988 | Horiuchi et al. | 303/114.1 |
| 4,750,789 | 6/1988 | Belart etal. | 303/114.1 |
| 4,800,289 | 1/1989 | Adachi et al. | 303/116.1 |
| 4,850,655 | 7/1989 | Takata et al. | 303/50 |
| 5,031,968 | 7/1991 | Takata | 303/50 |
| 5,080,449 | 1/1992 | Maehara | 303/119.1 |
| 5,141,296 | 8/1992 | Arikawa | 303/113.2 |
| 5,150,951 | 9/1992 | Leiber et al. | 303/DIG. 3 |
| 5,221,125 | 6/1993 | Okochi et al. | 303/113.3 |
| 5,531,509 | 7/1996 | Kellner et al. | 303/114.1 |
| 5,549,361 | 8/1996 | Sorensen | 303/3 |
| 5,593,215 | 1/1997 | Shaw et al. | 303/113.2 |
| 5,741,050 | 4/1998 | Ganzel et al. | 303/116.1 |

*Primary Examiner*—Robert J. Oberleitner
*Assistant Examiner*—Thomas J. Williams
*Attorney, Agent, or Firm*—MacMillan, Sobanski & Todd, LLC; A. Michael Tucker

[57] ABSTRACT

An integrated vehicular braking system which can provide ABS/TC/VSC control using a common auxiliary high pressure source for two circuits includes a separate boost valve pilot operated to control the flow from the high pressure source to provide brake boost. The boost valve is also actuated by a single solenoid to provide the fluid pressures necessary for full ABS/TC/VSC control. The boost valve is removed from a master cylinder/booster assembly, thereby minimizing pressure drops across the dynamic seals, and is not mechanically coupled to the booster or brake pedal. The boost valve is pressure balanced, thereby requiring reduced forces to operate the valve while providing improved brake pedal feel.

15 Claims, 7 Drawing Sheets

INTEGRATED ABS/TC/VSC BRAKING SYSTEM WITH SEPARATE BOOST VALVE

CROSS-REFERENCE TO RELATED APPLICATION

This application claims the benefit of United State provisional patent application identified as application Ser. No. 60/023,939, filed Aug. 14, 1996.

BACKGROUND OF THE INVENTION

This invention relates in general to a vehicular braking system, and in particular a vehicle stability control (VSC) system for use in an anti-lock brake (ABS) and traction control (TC) system.

Vehicles are commonly slowed and stopped with hydraulic braking systems. These systems vary in complexity but a base brake system typically includes a tandem master cylinder, pressure fluid conduit arranged in two similar but separate brake circuits, and wheel brakes in each circuit. The master cylinder generates hydraulic forces in both brake circuits by pressing brake fluid when the driver steps on the brake pedal. The pressurized fluid travels through the pressure fluid conduit in both circuits to actuate wheel brakes and slow the vehicle.

Base braking systems typically use a brake booster to provide a force to the master cylinder which assists the pedal force created by the driver. The booster can be vacuum or hydraulically operated. A hydraulic booster uses pressurized fluid in a brake booster to move the master cylinder piston thereby increasing the master cylinder pressures generated when the driver applies the brakes. Hydraulic boosters are commonly located adjacent the master cylinder piston and use a boost valve to control the pressurized fluid applied to the booster. Typically the boost valve is connected with the booster in the master cylinder assembly and mechanically coupled to the brake pedal for proper operation.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of ABS systems. An ABS system monitors wheel rotational behavior and selectively applies and relieves brake pressure in the corresponding wheel brakes in order to maintain the wheel speed within a selected slip range while achieving maximum braking forces. While such systems are typically adapted to control the braking of each braked wheel of the vehicle, some systems have been developed for controlling the braking of only a portion of the braked wheels.

Electronically controlled ABS valves, comprising isolation valves and dump valves, are located between the master cylinder and the wheel brakes and perform the pressure regulation. Typically, when activated, these ABS valves operate in three pressure control modes: pressure apply, pressure dump and pressure hold. The isolation valves allow brake pressure into the wheel brakes to increase pressure during the apply mode, and the dump valves release pressure from the wheel brakes during the dump mode. Wheel brake pressure is held constant during the hold mode.

A further development in braking technology has led to the introduction of traction control (TC) systems. Additional valves have been added to existing ABS systems to provide a braking system which controls wheel speed during acceleration. Excessive wheel speed during vehicle acceleration leads to wheel slippage and a loss of traction. An electronic control system senses this condition and automatically applies braking pressure to the wheel brakes of the slipping wheel to reduce the slippage and increase the traction available. In order to achieve optimal vehicle acceleration, braking pressures greater than the master cylinder pressure must quickly be available when the vehicle is accelerating.

During vehicle motion such as cornering, dynamic forces are generated which can reduce vehicle stability. A Vehicle Stability Control (VSC) braking system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

It would be desirable to provide an integrated ABS/TC/VSC braking system which would provide fluid pressures in excess of master cylinder pressure at any time for full ABS/TC/VSC control.

SUMMARY OF THE INVENTION

This invention relates to an integrated dual circuit vehicle braking system which provides ABS/TC/VSC control using a common auxiliary high pressure source for both circuits. A separate boost valve is pilot operated to control the flow from the high pressure source to provide boost. The boost valve is actuated by a single solenoid to provide the fluid pressures necessary for full ABS/TC/VSC control. The boost valve is removed from the master cylinder/booster assembly, thereby minimizing the pressure drops across the dynamic seals, and is not mechanically coupled to the booster or brake pedal. The boost valve is pressure balanced, thereby requiring reduced forces to operate the valve while providing improved brake pedal feel.

An improved pressure control scheme is used which moves the isolation valve fluid metering orifices out of base braking path to improve base braking response. The control scheme uses sequential control to provide superior pressure response during ABS/TC/VSC modes.

A new fail-safe detection valve is used to indicate any one of several failures. The fail-safe detection valve uses differential pressures to indicate a loss of pressure in either brake circuit. Also, a loss of boost pressure can be detected. Furthermore, this valve can determine the end of an ABS event.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
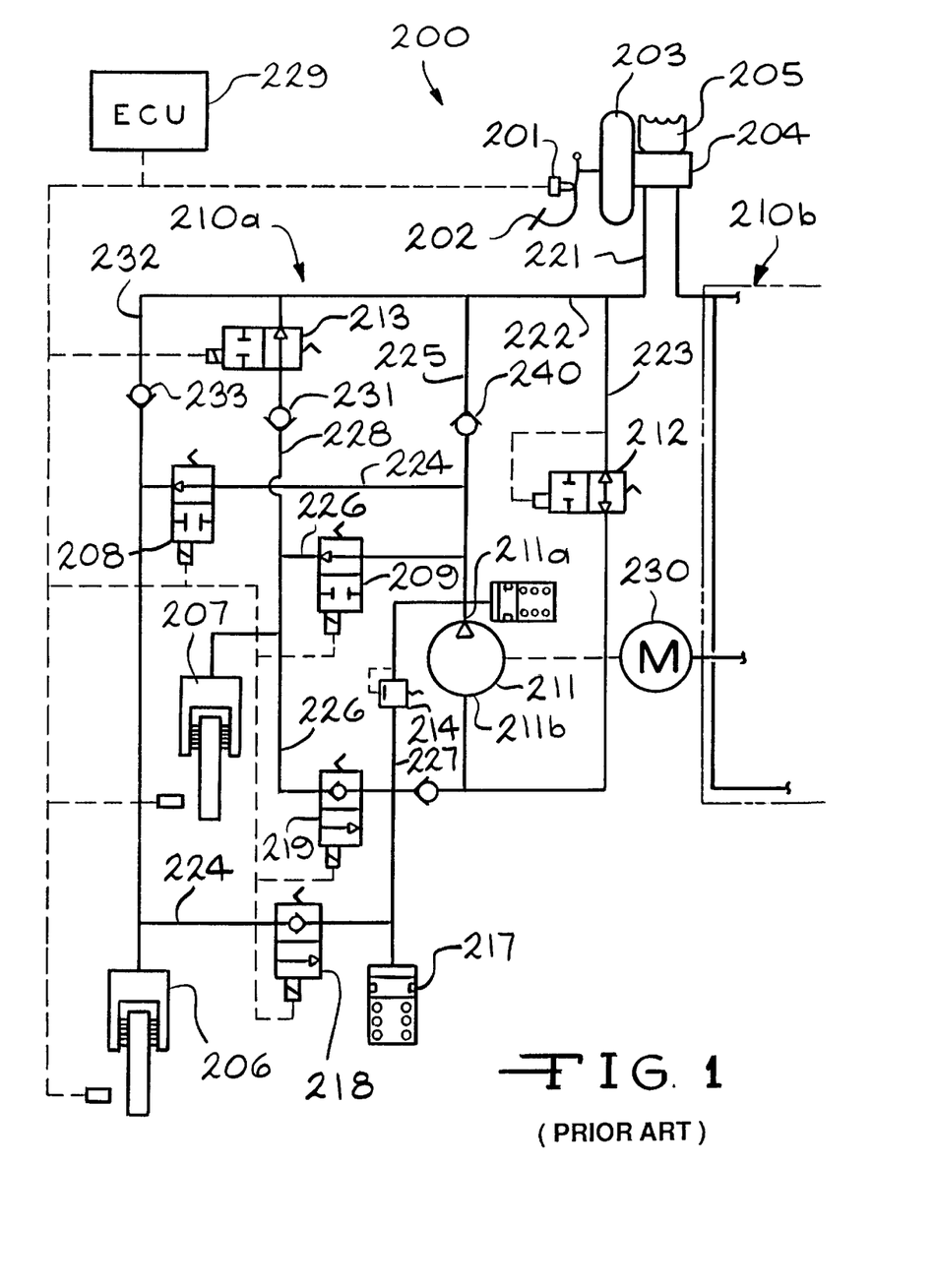
FIG. 1 is a hydraulic schematic of a pedal-isolated ABS/TC vehicle braking system which is known in the art.

FIG. 1 illustrates a pedal-isolated ABS/TC braking system 200 which is known in the art. A brake pedal 202 is connected to a booster 203 and tandem master cylinder 204. A brake switch 201 is used to indicate when the driver steps on the brake pedal 202. A reservoir 205 is connected to the master cylinder 204 and holds a supply of brake fluid at atmosphere pressure. The tandem master cylinder 204 is connected to two similar but separate brake circuits 210a, 210b. For simplicity, only the components in circuit 210a will be discussed.

A non-driven wheel brake 206 and a driven wheel brake 207 are connected to the master cylinder 204 via brake fluid conduit 221. Conduit 221 divides into conduits 222 and 223. Conduit 225 is connected between conduit 222 and the outlet 211a of a pump 211. Conduit 224 is connected to conduit 225 and is attached to the non-driven wheel brake 206. Conduit 225 is connected to conduit 226 and conduit 226 is attached to driven wheel brake 207. A 2-position, 2-way normally open solenoid isolation valve 208, 209 is located in each of conduits 224 and 226, respectively. Conduit 223 is connected to the inlet 211b of the pump 211. A normally open two-port two position pilot-operated supply valve 212 is located in conduit 223 between the master cylinder 204 and the pump 211.

Conduit 222 divides into conduits 228 and 232. Conduit 228 is connected to conduit 226 between the driven wheel isolation valve 209 and the driven wheel brake 207. A normally open two-port, two position solenoid valve 213 is located in conduit 228 A one-way check valve 231 is located in conduit 228 which allows fluid to flow through conduit 228 from the driven wheel brake 207, through the normally open solenoid valve 213 and back towards the master cylinder 204 but not in the opposite direction. Conduit 232 is connected to conduit 224 between the non-driven wheel isolation valve 208 and the non-driven wheel brake 206. A one-way check valve 233 is located in conduit 232 which allows fluid to flow through conduit 232 from the non-driven wheel brake 206 back towards the master cylinder 204 but not in the opposite direction.

Conduit 227 is connected to the pump inlet 211b and outlet 211a and contains a bypass valve 214. The bypass valve 214 allows fluid under high pressure to flow from the pump outlet 211a back to the pump inlet 211b. A low pressure accumulator 217 is located at the junction of conduits 223, 224 and 226 near the pump inlet 211b. A 2-position, 2-way normally closed solenoid dump valve 218, 219 is located in each of conduits 224 and 226, respectively, between respective wheel brakes 206, 207 and the low pressure accumulator 217. An electronic control unit (ECU) 229 is connected to each solenoid valve and shuttles the appropriate valves when necessary during ABS or TC modes.

During a base brake apply the master cylinder 204 pressurizes brake fluid when the driver pushes the brake pedal 202. Pressurized fluid flows from the master cylinder 204 through conduits 221, 222, and 225, through the isolation valve 208 and conduit 224 into the non-driven wheel brake 206. Pressurized fluid also flows to the driven wheel brake 207 from conduit 225 through conduit 226 and the isolation valve 209. The pressurized brake fluid reaching the wheel brakes 206 and 207 applies the brakes and slows the vehicle. Pressurized fluid also closes pilot-operated valve 212 thereby preventing pressurized fluid from reaching the pump inlet 211b.

When the brake pedal 202 is released, the master cylinder 204 no longer pressurizes the brake fluid thus reducing the pressure at the wheel brakes 206 and 207. The reduction in brake pressure causes the fluid to return back to the master cylinder 204 and reservoir 205 through the check valves 231 and 233. Some fluid will also return to the master cylinder 204 and reservoir 205 through the isolation valves 208 and 209. Pressurized fluid at the non-driven wheel brake 206 returns through conduits 224 and 232, check valve 233, and conduits 222 and 221. Pressurized fluid at the driven wheel brake 207 returns through two paths. The first path includes conduit 226, isolation valve 209, conduits 225 and 224, isolation valve 208, check valve 233 and conduits 232, 222 and 221. The second path includes conduit 228, check valve 231, valve 213 and conduits 222 and 221.

During an ABS event, the dump mode is entered to reduce pressure in the wheel brake of the slipping wheel. In ABS dump mode, the valves 212 and 213 are closed and open, respectively. Solenoid-operated isolation valves 208 and 209 are shuttled closed by the ECU. The solenoid-operated dump valve 218, 219 corresponding to the wheel brake 206, 207 of the slipping wheel is shuttled open. The pressurized fluid flows through the dump valve and into the low pressure accumulator 217. The ECU 229 also energizes motor 230 to drive the pump 211. The pump 211 runs throughout much of the ABS event. The pump 211 pumps fluid from the wheel brake 206, 207 of the slipping wheel and the low pressure accumulator 217 in a circular path through conduit 227 and the bypass valve 214.

In ABS hold mode, the pressure at the wheel brakes 206, 207 is held constant. The valves 212 and 213 remain closed and open, respectively. Isolation valves 208 and 209 remain closed and the open dump valves 218, 219 are also shuttled closed by the ECU 229. The pump continues to pump fluid, increasing the fluid pressure at the pump outlet 211a until the pressure relief valve 214 opens and the pump 211 pumps fluid in a circular path through conduit 227 and the bypass valve 214.

When the affected wheel has reached a predetermined slip level, the braking system enters ABS apply mode to begin braking the affected wheel again. In ABS apply mode, the valves 212 and 213 remain closed and open, respectively. The isolation valve 208, 209 corresponding to the affected wheel is pulsed open to apply pressurized fluid to the affected wheel brake 206, 207. The isolation valve is pulsed open and closed increasing the pressure until the pressures in all of the affected wheel brakes are equalized with the master cylinder pressure concluding the ABS event or the wheel slips again and dump mode is entered.

When the driven wheel begins to slip during acceleration, a traction control event occurs and braking pressure is applied to the slipping wheel. In traction control, the ECU 229 energizes motor 230 which drives the pump 211. Typically, the driver does not apply the brakes while accelerating and the pilot-operated supply valve 212 remains open during traction control. The pump draws fluid from the master cylinder 204 and reservoir 205 through the open supply valve 212 via conduits 221 and 223. Solenoid valve 213 is shuttled closed by the ECU 229 to isolate the pressurized fluid from the pump 211 at the driven wheel brake. Check valve 240 isolates the pump pressure from the master cylinder 204 preventing the pressure pulses from reaching the master cylinder through conduit 225. Solenoid valve 208 is shuttled closed to prevent fluid flow back to the master cylinder 204 through the check valve 233. The pump outlet 211a communicates with the driven wheel brake 207 through line 226 and the open isolation valve 209. The dump valves 218, 219 are closed. The isolation valve 209 controls the flow of pressurized fluid into the affected wheel brake until the proper driven wheel speed is obtained.

The traction control hold mode isolates fluid pressure at the driven wheel brake by closing the driven wheel isolation valve 209 and keeping the dump valve 219 closed. Valves 208 and 213 continue to be actuated to the closed position. If the pump pressure exceeds a predetermined pressure of approximately 2500 p.s.i., the bypass valve 214 opens to created a closed loop fluid path between the pump outlet 211a and pump inlet 211b and through conduit 227.

Pressure is relieved in the driven wheel brake 207 to decrease the braking force on the driven wheel during traction control dump mode. The driven wheel dump valve 219 is shuttled open and the isolation valve 209 is closed. The excess fluid returns to the master cylinder 204 and reservoir 205 via conduits 223 and 221. The pump 211 continues to operate and if the pump pressure exceeds a predetermined pressure of approximately 2500 p.s.i., the bypass valve 214 opens to create the closed loop path from pump outlet 211a to pump inlet 211b described above.

The ABS/TC system illustrated in FIG. 1 is a pedal isolated system. A check valve 240 is positioned between the pump outlet 211a and the master cylinder 204. The check valve 240 prevents pressure pulsations produced by the pump 211 from reaching the master cylinder 204 and being transmitted to the driver via the brake pedal 202.

Figure 2:
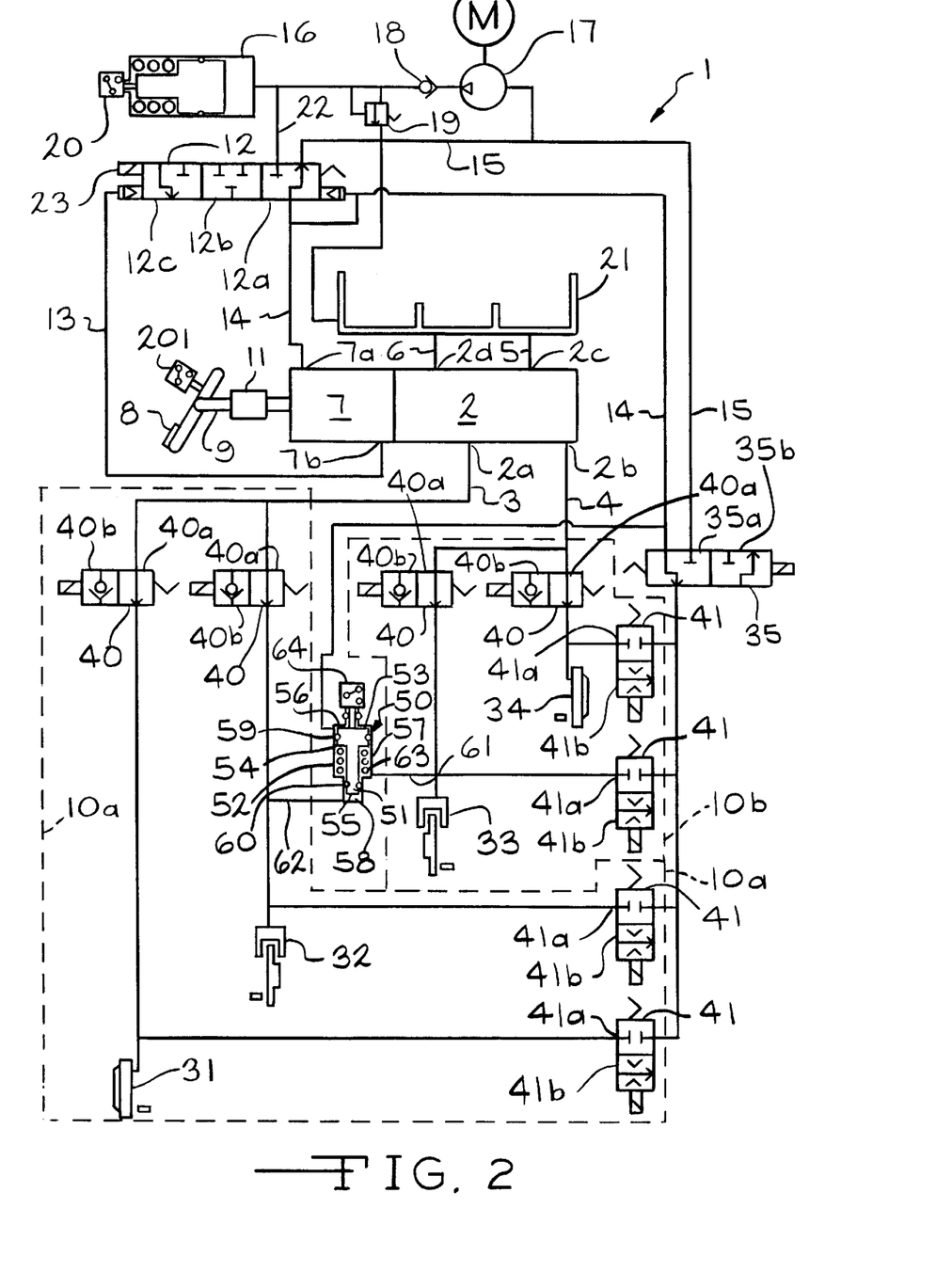
FIG. 2 is a hydraulic schematic of an integrated ABS/TC/VSC braking system in accordance with this invention.

FIG. 2 illustrates the integrated ABS/TC/VSC braking system 1 according to this invention. A tandem master cylinder 2 has two ports 2a and 2b connected to two similar but separate brake circuits 10a and 10b via respective conduits 3 and 4. An additional two ports 2c and 2d are connected to a reservoir 21 via conduits 5 and 6, respectively. The reservoir 21 contains a supply of brake fluid kept at approximately atmospheric pressure. A hydraulic booster 7 is coaxially connected to the master cylinder 2. A brake pedal 8 is connected to the booster 7 via linkage 9. A brake switch 201 is used to indicate when the driver steps on the brakes. A force transducer 11 measures the force applied to the booster 7 by the pedal 8.

A boost valve 12 for controlling pressure in the booster 7 is separated from the master cylinder 2 and booster 7. The boost valve 12 is a 3-position, 3-way pilot actuated valve that is also actuated by a solenoid 23. The boost valve 12 is not mechanically coupled to the booster 7 or brake pedal 8, but the boost valve 12 is hydraulically connected to the booster 7 by conduits 13 and 14. When the boost valve 12 is in its normal position 12a as shown, it connects conduit 14 to conduit 15 thereby connecting the booster 7 to the master cylinder reservoir 21. The boost valve 12 has a third position 12c which connects the booster 7 to a high pressure accumulator 16. The boost valve 12 has a second position 12b which disconnects both the accumulator 16 and the reservoir 21 from the booster 7.

A pump 17 provides pressurized fluid through check valve 18 to the accumulator 16 for storage. Check valve 18 may optionally be positioned within the output of pump 17. Pressure relief valve 19 provides a closed loop return path from the pump output to the pump inlet when the pump output pressure exceeds a predetermined pressure. A switch 20 provides an indication of when the accumulator 16 is full.

The master cylinder 2 is connected to the wheel brakes 31 and 32 via conduit 3 and to the wheel brakes 33 and 34 via conduit 4. An isolation valve 40 is located between each of the wheel brakes 31–34 and the master cylinder 2. The normally open 2-position, 2-way solenoid-operated isolation valves 40 can be individually switched from the normally open position 40a to the one-way position 40b to prevent pressurized fluid from the master cylinder 2 from reaching the wheel brakes 31–34. A 2-position, 3-way valve 35 connects either conduit 14 or 15 to the wheel brakes 31–34. A dump/reapply valve 41 is located between each wheel brake 31–34 and the 2-3 valve 35. The operation of the isolation valves 40 and dump/reapply valves 41 will be discussed below.

A fail-safe detection valve 50 has a piston 51 sealed in a cylindrical stepped bore 52 for axial movement therein. The piston 51 has first 53, second 54, and third 55 surfaces housed within respective first 56, second 57 and third 58 chambers of the bore 52. The first piston surface 53 is separated from the. second surface 54 by a fluid tight seal 59 which prevents fluid transfer between the first and second chambers 56 and 57. The second surface 54 is separated from the third surface 55 by a fluid tight seal 60 which prevents fluid transfer between the second and third chambers 57 and 58.

The first chamber 56 is connected to the booster 7 via conduit 14. The second chamber 57 is connected to a wheel brake 33 in the second brake circuit 10b via conduit 61. The third chamber 58 is connected to a wheel brake 32 in the first brake circuit 10a via conduit 62. A spring 63 biases the piston 51 towards the first chamber 56 to a first position and into contact with a switch 64.

The surface area of the piston's fast surface 53 is equal to the sum of the surface areas of the second 54 and third 55 surfaces. When the fluid pressures in all three chambers 56–58 are equal the piston 51 is slightly biased by spring 63 into the first position. If the fluid pressure in chamber 2 or 3 drops, the piston will move away from the first position. During base braking, the fluid pressure in the booster 7 will equal the fluid pressure in the wheel brakes 31–34 and the piston 51 will be in the first position.

The fail-safe detection valve 50 serves three functions. First, it indicates the loss of fluid pressure in either brake circuit 10a or 10b by comparing them to the pressure from the booster 7. If the pressure is lost in one of the brake circuits, the force acting on the first surface 53 will be greater than the combined forces acting on the second 54 and third 55 surfaces. Therefore, the piston 51 will move away from the first position which will be indicated by switch 64.

The fail-safe detection valve 50 also indicates the loss of boost pressure in conduit 14. During ABS, the isolation valves 40 are energized to isolate the wheel brakes 31–34 from the master cylinder 2 so that pressure can be dumped off the brakes to allow the corresponding wheel to spin up and stop skidding. The pressures at the wheel brakes 31–34 will therefore be lower than the boost pressure and the piston 51 will be moved away from the first position. If the piston 51 moves back to the first position in ABS, boost pressure has been lost which is indicated by switch 64. Without boost pressure, the brakes can not be reapplied during ABS.

Finally, the fail-safe detection valve 50 indicates when the brake pressures equal the booster pressure at the end of an ABS stop. As mentioned above, during an ABS event, the brake pressure in a skidding wheel is alternately dumped off and then reapplied. By the end of the ABS event, the brake pressure has been gradually increased to equal the pressure of the booster. When these pressures are equal the ABS event is concluded so the dump/reapply valves 41 can stop being pulsed and the isolation valves 40 can be opened to allow base braking. When the pressure at the wheel brakes 31–34 equals the boost pressure, the piston 51 moves back to the first position as described above.

During normal braking, the pressurized fluid from the master cylinder 2 flows through the isolation valves 40 to the wheel brakes 31–34. When the brake pedal 8 is released, the pressurized fluid in the wheel brakes flows back through the isolation valves 40 to the master cylinder 2.

Solenoid valves 40 used to apply pressure to wheel brakes during ABS/TC/VSC events use an orifice to control the amount of pressure applied while the valve is pulsed open. Due to inherent characteristics of the solenoid valve, only a finite minimum opening time can be achieved. In order to provide accurate pressure control, the pressure increase allowed during the minimum opening time must be made sufficiently small. This is accomplished by using an orifice to restrict the fluid flow through the open valve. When the solenoid valves used for ABS/TC/VSC pressure control are in the base bring path the base braking pressure response is compromised. The base brake response can be improved by removing the metering orifices from the isolation valves 40, thereby taking them out of the base braking path. The metering orifices are placed in the dump/reapply valves 41 which are used to control pressure at the wheel brakes 31–34 during the ABS/TC/VSC modes.

When an ABS event occurs, the appropriate isolation valve is energized and the pump 17 runs to maintain pressed fluid in conduit 22. The dump mode is entered and the 2-3 valve 35 is shifted to the second position 35b thereby connecting the dump/reapply valves 41 to the reservoir 21. The dump/reapply valve 41 connected to the wheel brake corresponding to the slipping wheel is shifted to the open position 41b by the electronic control unit (not shown) and the brake pressure at the slipping wheel is reduced. The unbraked wheel eventually spins back up to near the vehicle speed and the wheel is braked again by entering the apply mode.

During the apply mode the 2-3 valve 35 is shifted to the first position 35a allowing the pressurized fluid to reach the dump/reapply valves 41. The dump/reapply valve 41 connected to the wheel brake of the slipping wheel is actuated by the electronic control unit (not shown) to the open position 41b. The dump/reapply valve 41 is briefly pulsed open to allow pressurized fluid through the metering orifice and into the wheel brake to brake the affected wheel. The dump valve 41 is pulsed open and closed repeatedly until the proper pressure is reached. Depending on the road surface, several dump and apply modes may be used until the wheel stops slipping and the ABS event is concluded.

Brake pressure regulation during traction control is similar to ABS but fluid pressures greater than those generated by the master cylinder are required. The traction control apply and dump modes use the same dump/reapply valves as the ABS mode described above.

The dump/reapply valves 41 and 2-3 valve 35 can be sequentially controlled to provide the necessary pressure regulation for the individual wheel brakes 31–34. For example, a typical pressure apply mode for a single wheel brake pulses the dump/reapply valve for a short duration to apply pressure to the wheel brake. A relatively long hold mode then follows the apply mode. This apply and hold response is repeated until the proper pressure is obtained. Pressure on other wheel brakes can be regulated during the relatively lengthy hold periods, thereby forming a sequential pressure regulation routine tending to the pressure requirements of each wheel brake one cylinder at a time.

Figure 3:
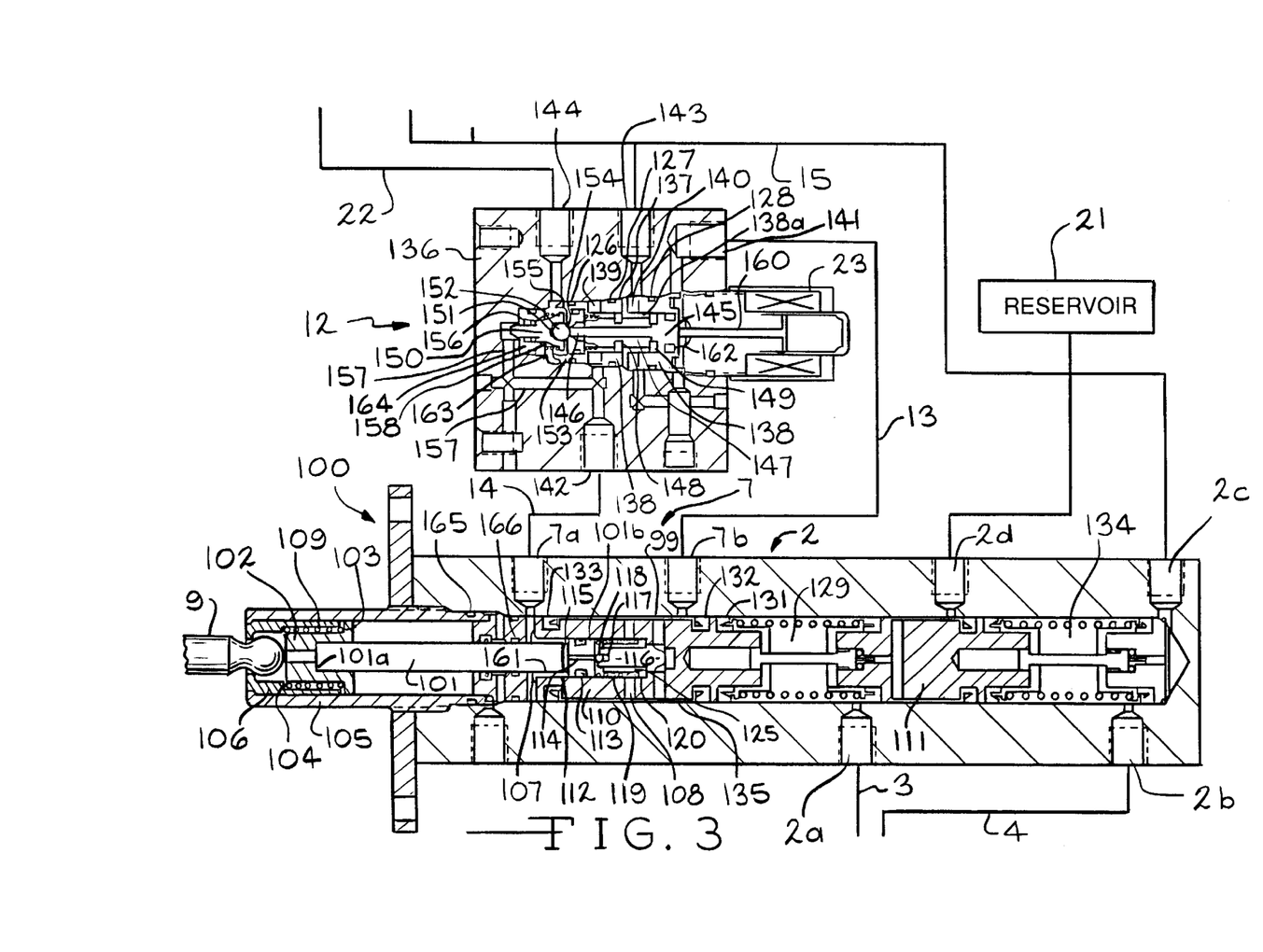
FIG. 3 is sectional elevational view of a master cylinder assembly and a boost valve illustrated in FIG. 2.

Referring now to FIG. 3, the master cylinder 2, booster 7 and separate boost valve 12 are shown in more detail. A master cylinder assembly 100 comprises the master cylinder 2 and booster 7 which are coaxially arranged in a cylindrical bore 99. A hollow cylindrical insert 105 is threaded into the bore 99 and sealed with an o-ring 165.

The booster 7 comprises an input rod 101 having a first end 101a and a second end 101b separated by an o-ring seal 166. The first end 110a abuts a first collar 102. The collar 102 and input rod 101 move together axially within the cylindrical insert 105. The brake linkage 9 abuts the collar 102 for applying axial forces to the input rod 101 which push the input rod to the right when the driver pushes on the brake pedal 8. A first spring 109 is located within the insert 105 between a shoulder 103 formed on the collar 102 and a stop 104 formed in the barrel of a retainer 106.

The tandem master cylinder has coaxial primary and secondary pistons 110 and 111 located within the bore 99 of the master cylinder assembly 100. The pistons 110, 111 move together creating similar pressures in corresponding output chambers 129 and 134. The spring 109 provides an axial force between the input rod 101 and the brake linkage 9 which keeps the brake pedal 8 from falling during traction control as the input rod 101 moves with the master cylinder primary piston 110. This allows the use of an regular, unmodified brake switch 201. To avoid duplication only the primary piston 110 will be discussed.

The primary piston 110 has first, second and third lip seals 131, 132, 133. The first and second lip seals 131, 132 seal the primary piston and separate the primary output chamber 129 from the booster chamber 135. As mentioned above, the booster chamber 135 receives pressurized fluid from the accumulator 16 to hydraulically assist the forces provided by the input rod 101 which move the primary pistons 110. The third lip steal 133 allows fluid to flow from port 7a into the booster chamber 135 but not from the booster chamber to port 7a. Seal 133 allows a pressure differential between ports 7a and 7b which is used to operate the boost valve 12.

The primary piston 110 has an axial bore 112 and an intersecting radial bore 108. The second end 101b of the input rod 101 has a larger diameter which extends into the axial bore 112. A lip seal 113 seals the input rod 101 within primary piston bore 112. A smaller axial bore 114 is formed in the end face of the input rod second end 101b. A radial bore 115 is also formed in the input rod 101 and intersects the axial bore 114. A collar 107 located in the piston axial bore 112 surrounds the input rod 101 providing channels 161 between the input rod 101 and the collar 107 for fluid to flow between port 7a and the radial bore 115.

A poppet 116 is located in the primary piston bore 112 adjacent the input rod second end 101b. A bore 117 is formed in the end of the poppet 116 facing the input rod 101. A ball 118 is pressed into the bore 117 and seats against the axial bore 114 in the input rod 101. A second spring 119 is located within the primary piston bore 112 between the end face of the input rod 101 and a shoulder 120 formed on a collar 125 surrounding the poppet 116. The second spring 119 provides a bias force that is greater than the bias force applied by the first spring 109. The collar 125 provides a stop which limits movement of the input rod 101 to the right. The collar 125 is optional and its function can be accomplished by a stop formed in the primary piston bore 112.

As mentioned above, the boost valve 12 is separated from the master cylinder assembly 100. The boost valve 12 is both pilot operated and solenoid operated. The valve 12 has a valve body 136 provided with a central stepped bore 137. Four ports 141–144 are formed in the valve body 136 and each intersect the central bore 137. Port 141 is connected to the booster port 7b via conduit 13. Port 142 is connected to the booster port 7a via conduit 14. Port 143 is connected to the reservoir via conduit 15. Port 144 is connected to the high pressure accumulator 16 via conduit 22.

A hollow cylindrical sleeve 138 having an axial bore 138a is located in the valve body central bore 137 and sealed with o-rings 126, 127, and 128. The sleeve 138 has a radial bore 139 which is aligned with port 142 that allows fluid to flow from the port into the sleeve's axial bore 135. A slot 140 is formed in sleeve 138 which is aligned with port 143.

A cylindrical spool 145 is located in the axial bore 138a of the sleeve 138 for axial movement therein. A lip seal 162 prevents fluid from port 141 from flowing past the spool 145 which causes the spool to behave as a piston which is axially moveable in response to the pressure difference on each side of the seal 162. The spool 145 has 2 axial bores 147 and a coaxial protrusion 146 therebetween. Two annular grooves 148, 149 are formed in the outer surface of the spool 145. When the spool moves and aligns slot 140 with either of the annular grooves 148 or 149, fluid is metered into the axial bores 147. The fluid then travels through radial bore 139 to port 142.

An end sleeve 164 is disposed within the central bore 137, A radial bore 163 is formed in the end sleeve 164. A poppet 150 is located within the end sleeve 164. The poppet 150 is axially movable and is sealed by an o-ring 156. The seal 156 divides the poppet 150 into a front portion and a rear portion. The front portion has a cavity 151 facing the spool protrusion 146. A ball 152 is pressed into the cavity 151. An annular element 153 is located within the axial bore 135 of the sleeve 138. The element has a central orifice 154 with a diameter that is larger than the diameter of the spool protrusion 146. A valve seat 155 surrounds the orifice 154 adjacent the ball 152. An internal conduit 157 connects port 142 to the rear portion of the poppet 150 providing a pressure balance on each side of the poppet 150. The pressure balanced poppet 150 can be moved to open the orifice 154 with less force.

A spring 158 located around the periphery of the poppet 150 biases the poppet 150 and ball 152 towards the valve seat 155. A solenoid 23 has a plunger 160 which abuts the spool 145. When the solenoid 23 is actuated the plunger 160 moves axially thereby moving the spool 145.

Depending on the position of the spool 145, fluid paths between ports 142 and 143 or 142 and 144 can be opened or closed. Fluid can flow between ports 142 and 143 by flowing through the sleeve radial bore 139 into the spool axial bore 147 through the annular spool groove 148 and past the metering edge on slot 140. Fluid can flow between ports 142 and 144 by flowing through the sleeve radial bore 139, through orifice 154 and through a radial bore 163 in the end sleeve 164.

The operation of the master cylinder assembly 100 and separate boost valve 12 will now be described. When the driver is not applying the brakes, the second spring 119 pushes against the input rod 101 overcoming the force of spring 109 to move the input rod 101 to the left thereby unseating ball 118. The pressure at ports 7a and 7b can now be equalized by the flow of fluid through the channels 161 between the collar 107 and input rod 101, through bores 115 and 114 in the input rod 101, through the bore 108 in the master cylinder piston, and into the booster chamber 135.

When the driver applies the brakes by pushing the brake pedal 8, this force is transmitted to the input rod 101 via linkage 9. The input rod 101 moves right against the poppet 116. The ball 118 seats against bore 114 preventing fluid from freely flowing between ports 7a and 7b. As the input rod 101 moves right pressure is built in the boost chamber 135 that is greater than the pressure at port 7a.

The pressure from the booster chamber 135 is transmitted to the booster valve port 141 creating a pressure differential between ports 141 and 142 and across lip seal 162. This greater pressure at port 141 moves the spool 145 to the left moving the annular spool groove 148 out of alignment with the slot 140 thereby closing off the connection between port 142 and 143. This arrangement provides the advantage that the pressure drop between ports 142 and 143 is across the walls of the spool 145 rather than across a dynamic seal thereby reducing seal friction.

As the driver increases pressure on the brake pedal 8, the pressure in the booster chamber 135 increases which moves the spool 145 further to the left. As the spool 145 continues moving left, the spool protrusion 146 extends through orifice 154, abuts the ball 152 and moves the ball off the seat 155 thereby opening the connection between ports 142 and 144. The high pressure fluid from accumulator 16 now flows into port 144, through the opened orifice 154 and pushes the spool 145 back to the right. An equilibrium is eventually reached leaving the spool 145 in the central position where ball 152 has closed off orifice 154 and spool groove 148 is out of alignment with slot 140 thus closing off port 142 from both ports 143 and 144.

If the driver applies more pressure to the brake pedal 8, thereby increasing the pressure in the booster chamber 135, the spool 145 moves left opening orifice 154 which allows pressurized fluid from accumulator 16 to move the piston back into equilibrium. Conversely, if the driver reduces pressure on the brake pedal 8, pressure in booster chamber 135 is reduced and the spool 145 moves right. As the spool moves right, the spool groove 148 is aligned with slot 140 and a portion of the pressurized fluid to the left of the spool 145 is vented to the reservoir. Once the pressure to the left of the spool 145 falls slightly below the pressure in the booster chamber 135 the spool 145 moves back to the central position and equilibrium is reached. Therefore, the pressure at the booster port 7a will track slightly below the pressure at booster part 7b.

The pressure in the booster chamber 135 not only provides brake boost which assists the forces produced by the input rod 101 to move the master cylinder pistons 110 and 111, but seal 166 defines a pressure area which is pushed back against the input rod 101 thereby providing pedal feedback to the driver. The braking system shown in FIG. 1 uses check valve 240 to prevent pressure pulses from pump 211 from reaching the master cylinder 204. When the pump 211 is rig and the driver is stepping on the brake pedal the driver experiences a hard brake pedal due to the pump pressure against valve 240. Here, the driver experiences a firm pedal with slight pulsation during base braking.

Figure 4:
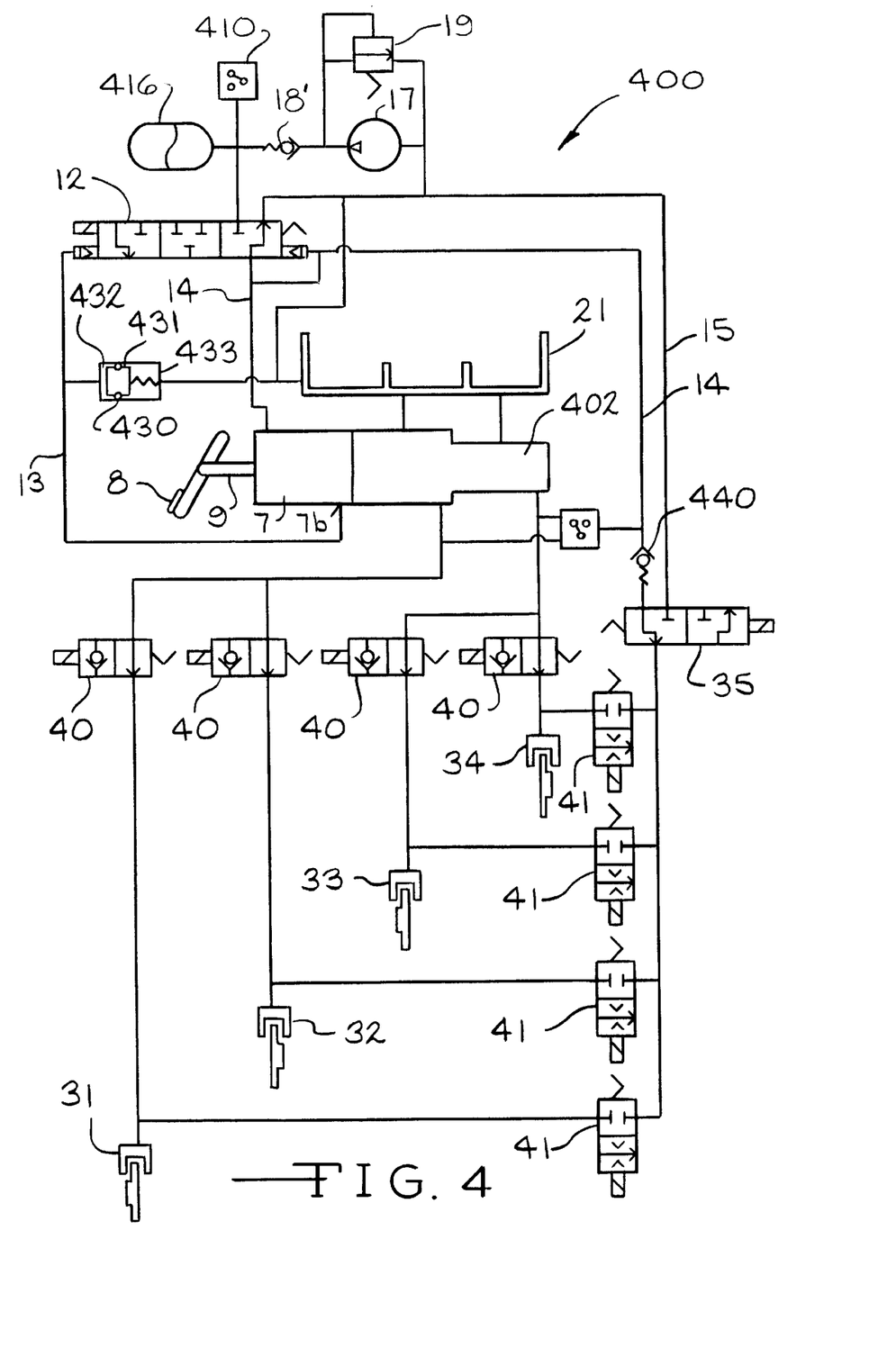
FIG. 4 is a hydraulic schematic of a first alternate embodiment of the braking system illustrated in FIG. 2.

Referring now to FIG. 4 an alternate embodiment 400 of the integrated ABS/TC/VSC braking system 1 shown in FIG. 2 is illustrated. A stepped master cylinder 402 is used. Preferably, a dual center port master cylinder may be used. This system uses a gas charged accumulator 416 coupled with a pressure switch 410 as a high pressure storage device instead of the spring accumulator 16 of FIG. 2. A spring biased one-way check valve 18' is used in place of the one-way check valve 18.

An optional accumulator 430 is used between conduit 13 and the reservoir 21 to set the runout pressure. The accumulator 430 includes a spring biased piston 431 sealingly separating a first chamber 432 from a second chamber 433. Conduit 13 is connected to the first chamber and the reservoir 21 is connected to the second chamber. The runout is the pressure at which the booster no longer provides additional assistance to the input rod for producing master cylinder pressure. For example, if the high pressure accumulator 416 stores fluid at 1500 p.s.i., then the booster will not provide assistance above brake pressures of 1500 p.s.i. The accumulator 430 limits the pressure at port 7b to a predetermined level by filling the first chamber 432 at that predetermined pressure. With the pressure at port 7b limited, the booster will no longer provide additional assistance above that pressure limit. Any additional master cylinder pressures generated must be provided by the input rod 101. Optionally, a relief valve (not shown) can be used in place of accumulator 430.

A spring biased one-way check valve 440 is located in conduit 14 between the 2-3 valve 35 and the booster valve 12. The check valve 440 is an optional redundant valve for preventing loss of brake pressure if a dump/reapply valve 41 should fail in the open position. The system 400 operates similarly to the system 1 described above.

Figure 5:
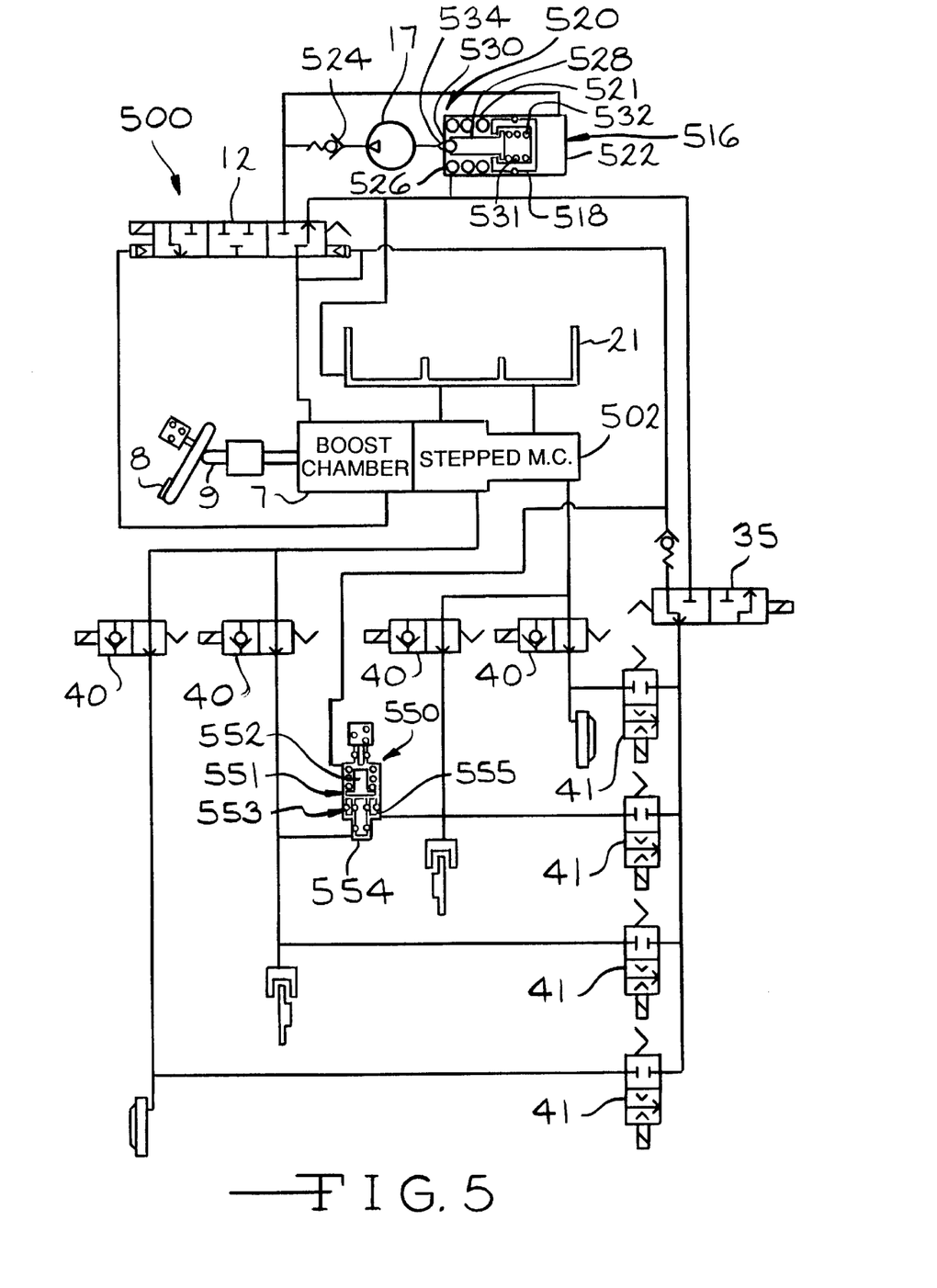
FIG. 5 is a hydraulic schematic of a second alternate embodiment of the braking system illustrated in FIG. 2.

FIG. 5 illustrates a second alternate embodiment 500 of the integrated ABS/TC/VSC braking system 1 shown in FIG. 2. A stepped master cylinder 502, like stepped master cylinder 402, is used. The accumulator 516 includes a piston 518 sealingly separating a first chamber 521 from a second chamber 522. The first chamber 521 is connected to the inlet of the pump 17 and the second chamber 522 is connected to the outlet of the pump and boost valve 12. A spring loaded one-way check valve 524 is located between the outlet of the pump 17 and the second chamber 522 which allows fluid to from the pump to the second chamber 522. A large spring 526 biases the piston 518 towards the second chamber 522. A poppet 528 having a check element 530 is retained within a cavity 531 of the piston for slidable movement therein. The poppet 528 extends from the piston cavity into the first chamber 521. A spring 532 biases the poppet 528 outwardly from the piston cavity 531. The first chamber 521 is also connected to the reservoir 21. A valve seat 534 is aligned with the check element 530. The poppet 528, check element 530 and valve seat 534 together comprise a pump starver valve 520. The pump starver valve 520 replaces the pressure relief valve 19 of FIG. 2. Instead of opening to produce a closed loop flow path between the pump inlet and outlet to prevent excessive pump pressures, the pump starver valve 520 blocks the inlet of the pump 17 when the accumulator 516 is filled. As the second chamber 522 of the accumulator 516 fills with pressurized fluid, piston 518 moves to the left as shown in FIG. 5 against the force of the large spring 526. As the piston 518 moves to the left, the check element 530 seats against the valve seat 534 closing off communication between the pump inlet and the reservoir 21. When the pump inlet is blocked, the pump 17 runs without pumping fluid which maintains a constant pressure at the pump outlet. The piston 532 can overtravel, that is continue to move left, after the check element 530 seats against the valve seat 534 because the poppet 528 can move against the small spring 532 in the piston cavity 531.

An alternate embodiment of the fail-safe valve 550 is also shown. The single stepped piston 51 of FIG. 2 is replaced by a piston arrangement 551. The piston arrangement 551 includes a plunger 552 abutting a two-piece piston 553 having a central piston 554 and an annular piston 555 coaxially disposed thereabout. The fail-safe valve 550 operates similarly to the fail-safe valve 50 shown in FIG. 2.

Figure 6:
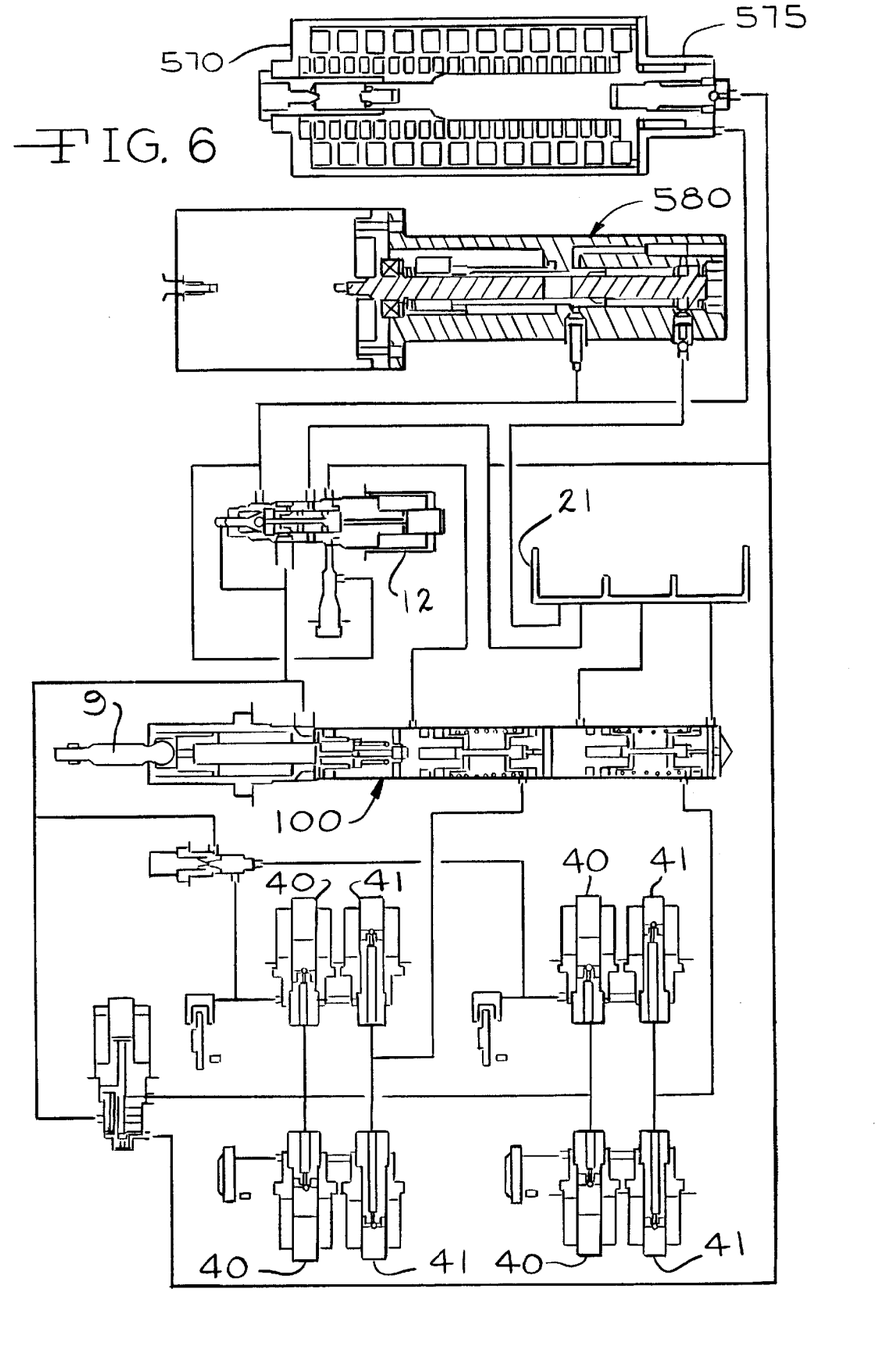
FIG. 6 is a hydraulic schematic of a third alternate embodiment of the braking system illustrated in FIG. 2.

FIG. 6 illustrates a third alternate embodiment of the integrated ABS/TC/VSC braking system shown in FIG. 2. A spring accumulator 570 replaces the accumulator 16 of FIG. 2 and includes a pressure responsive bypass valve 575. A ball screw pump 580 is used as the single auxiliary pressure source.

Figure 7:
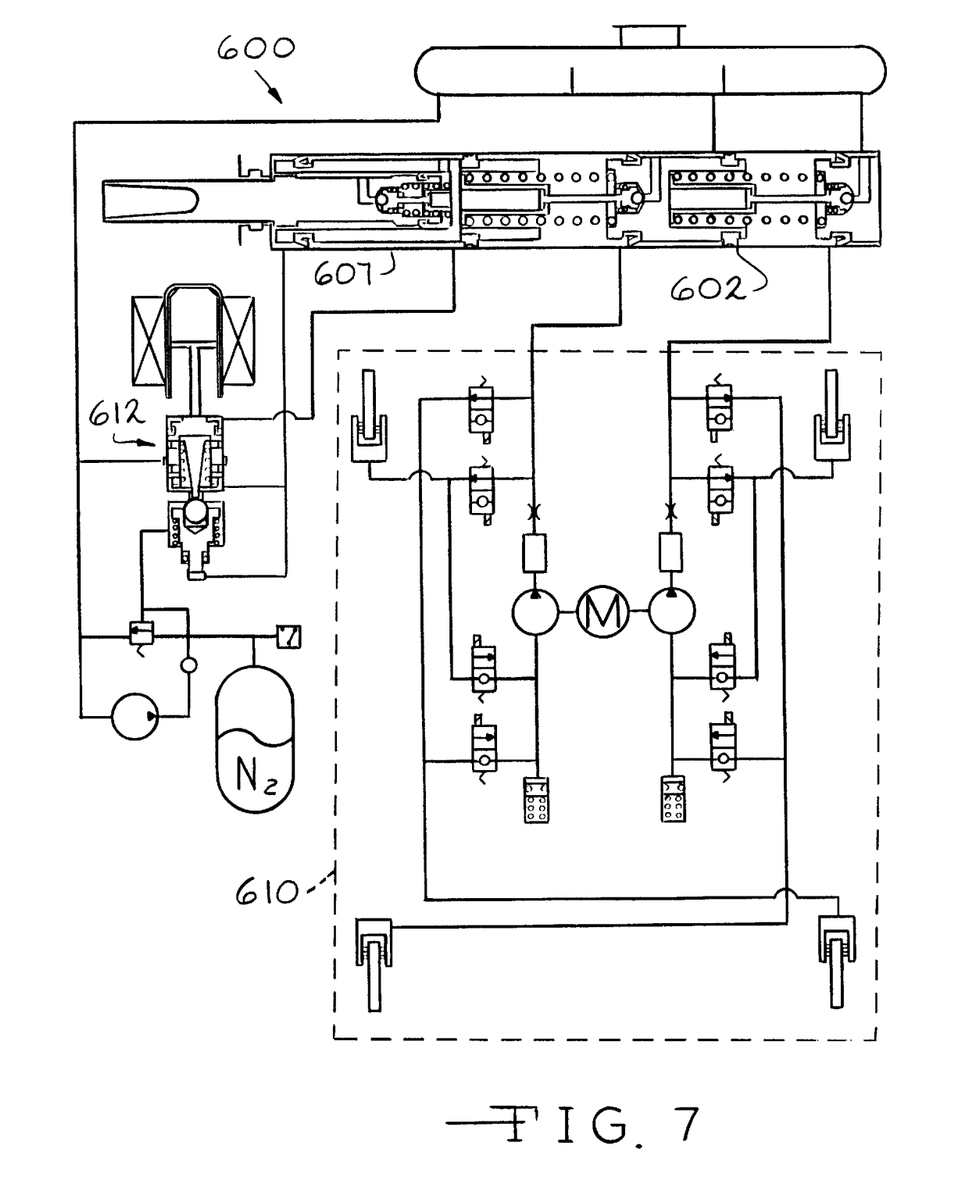
FIG. 7 is a hydraulic schematic of a fourth alternate embodiment of the braking system illustrated in FIG. 2.

Referring now to FIG. 7 an "add-on" ABS system 600 is shown. This system uses a master cylinder 602, booster 607, and a separate boost valve 612 which are connected to a conventional ABS brake system 610 to achieve ABS control. The master cylinder 602, booster 607 and boost valve 612 operate similarly to the master cylinder 2, booster 7 and boost valve 12 shown in FIG. 2 and described above.

In accordance with the provisions of the patent statutes, the principle and mode of operation of this invention have been described and illustrated in its preferred embodiment. However, it must be understood that this invention may be practiced otherwise than as specifically explained and illustrated without departing from its spirit or scope.

What is claimed is:

1. A vehicular braking system for hydraulically actuated wheel brakes comprising:

a master cylinder;

a booster connected to the master cylinder;

a brake circuit having wheel brakes and fluid conduit connecting the wheel brakes to the master cylinder; and a boost valve mechanically decoupled from the booster and master cylinder for controlling fluid flow to the booster, wherein the boost valve is hydraulically actuated and hydraulically connected to the booster and includes a solenoid, wherein the boost valve is also actuated by the solenoid; and an auxiliary pressure source hydraulically connected to the brake circuit and the boost valve.

2. The vehicular braking system defined in claim 1 wherein the boost valve is pressure balanced.

3. The vehicular braking system defined in claim 1 including an auxiliary pressure source connected to the brake circuit and the booster valve.

4. The vehicular braking system defined in claim 3 wherein the auxiliary pressure source includes a pump and an accumulator.

5. The vehicular braking system defined in claim 3 including:

isolation valves between the master cylinder and the wheel brakes for allowing flow between the master cylinder and the wheel brakes during normal base braking and preventing flow from the wheel brakes to the master cylinder during anti-lock braking; and dump/reapply valves connected to the wheel brakes for selectively releasing pressurized fluid from the wheel brakes.

6. The vehicular braking system defined in claim 5 wherein the dump/reapply valves also selectively connect the wheel brakes to the auxiliary pressure source.

7. The vehicular braking system defined in claim 1 including a differential pressure fail-safe detection valve hydraulically connected to the brake circuit and the booster.

8. The vehicular braking system defined in claim 1 wherein the boost valve is remotely located from the master cylinder.

9. The vehicular braking system defined in claim 1 wherein the boost valve is hydraulically pilot operated.

10. An integrated ABS/TC/VSC vehicular braking system comprising:

a master cylinder;

a reservoir connected to the master cylinder;

a booster connected to the master cylinder;

a brake circuit having wheel brakes and fluid conduit connecting the wheel brakes to the master cylinder;

a boost valve mechanically decoupled from the booster and master cylinder for controlling fluid flow to the booster wherein the boost valve is pilot operated to provide brake boost and solenoid operated to provide VSC braking pressures;

an auxiliary pressure source connected to the brake circuit and the booster valve; and a differential pressure fail-safe detection valve connected to the brake circuit and the booster for indicating a pressure failure in the brake circuit and the booster.

11. The vehicular braking system defined in claim 10 wherein the boost valve is remotely located from the master cylinder.

12. The vehicular braking system defined in claim 1 including:

isolation valves between the master cylinder and the wheel brakes for allowing flow between the master cylinder and the wheel brakes during normal base braking and preventing flow from the wheel brakes to the master cylinder during anti-lock braking; and dump/reapply valves connected to the wheel brakes for selectively releasing pressurized fluid from the wheel brakes.

13. The vehicular braking system defined in claim 12 wherein the dump/reapply valves also selectively connect the wheel brakes to the auxiliary pressure source.

14. The vehicular braking system defined in claim 13 wherein the auxiliary pressure source includes a pump and an accumulator.

15. The vehicular braking system defined in claim 14 wherein the boost valve is pressure balanced.

* * * * *